United States Patent [19]

Segura et al.

[11] Patent Number: 5,108,929
[45] Date of Patent: Apr. 28, 1992

[54] METHOD AND SYSTEM FOR TREATMENT OF ALKALINE STREAMS

[75] Inventors: John S. Segura, Glen Ellyn, Ill.; David M. Forstrom, Norcross, Ga.

[73] Assignee: Liquid Carbonic Corporation, Chicago, Ill.

[21] Appl. No.: 393,491

[22] Filed: Aug. 14, 1989

[51] Int. Cl.$^5$ ............................................. G01N 30/32
[52] U.S. Cl. ...................................... 436/55; 422/75; 422/62; 422/111; 436/51; 210/96.1
[58] Field of Search ............... 422/75, 257, 62, 111; 436/55, 51; 210/96.1, 709, 740, 743

[56] References Cited

U.S. PATENT DOCUMENTS

| 4,830,743 | 5/1989 | Koster et al. | 210/96.1 |
| 4,854,713 | 8/1989 | Soechtig | 422/111 |

FOREIGN PATENT DOCUMENTS

| 2638428 | 3/1978 | Fed. Rep. of Germany | 210/96.1 |
| 77044559 | 11/1977 | Japan | 210/96.1 |
| 53-135899 | 11/1978 | Japan | 210/96.1 |

Primary Examiner—Robert J. Hill, Jr.
Assistant Examiner—Abanti B. Singla
Attorney, Agent, or Firm—Fitch, Even, Tabin & Flanner

[57] ABSTRACT

Efficient control of the pH of a flowing alkaline wastewater stream is accomplished by monitoring the pH of the flowing stream, generating a signal in response to the pH monitored, and injecting $CO_2$ as necessary to reduce the pH. High pressure liquid $CO_2$ is supplied to a proportional control valve which is operated in response to the signal to change the high pressure $CO_2$ fluid to an intermediate pressure $CO_2$ fluid in a manner so as to significantly reduce its density by creating a significant gaseous fraction. This lower density $CO_2$ fluid is supplied to a spring-loaded injector having an orifice in communication with the flowing stream. The intermediate pressure is above the pressure at which the injector opens whereby the lower density $CO_2$ fluid is injected into the flowing stream, allowing particularly precise control to be achieved.

11 Claims, 2 Drawing Sheets

METHOD AND SYSTEM FOR TREATMENT OF ALKALINE STREAMS

The invention relates to methods for controlling the pH of a flowing alkaline stream and more particularly to methods and systems for the efficient injection of carbon dioxide into a flowing alkaline stream to maintain its pH in a generally neutral range.

BACKGROUND OF THE INVENTION

Wastewater streams from industries using large amounts of processing water, such as the textile industry in its various dyeing operations, often generate large quantities of aqueous wastewater which can be fairly highly alkaline in content. Before such streams can be discharged either to a municipal treatment plant or to the environment, they must be neutralized. Such neutralization has frequently been carried out using strong mineral acids; however, in recent years carbon dioxide, which forms carbonic acid when dissolved in water, has frequently been used for neutralizing such alkaline wastewaters.

As depicted in U.S. Pat. No. 4,743,405, issued May 10, 1988, apparatus is shown for injecting gaseous $CO_2$ into a flowing alkaline liquid. More particularly the gaseous $CO_2$ is supplied to an enclosure or compartment which surrounds a section of a conduit through which the alkaline stream is flowing and which serves as a manifold to supply gaseous $CO_2$ through a plurality of hollow needles which project into the flowing stream. In such systems of this general type for the neutralization of alkaline streams, it has been conventional to inject $CO_2$ in the gaseous form. Because it is common to store $CO_2$ in the liquid state, usually at about 300 psig and 0° F., it is necessary to supply equipment to vaporize the liquid $CO_2$ before it can be delivered to such a gas injection apparatus.

As far back as 1928, as shown in U.S. Pat. No. 1,655,816 to Josephson, various attempts were made to inject liquid $CO_2$ for carbonation purposes. More recently, U.S. Pat. No. 4,068,010, issued Jan. 10, 1978, shows a method for liquid $CO_2$ injection to simultaneously carbonate and cool a flowing aqueous stream to produce a carbonated beverage or the like. Such an application requires fairly high quantities of carbon dioxide, and as a result, the creation of water ice crystals is a potential problem which is taken into account by the injection of pumped liquid $CO_2$ at fairly high pressures, e.g. between 300 and 2000 psi, through a spring-loaded valve.

Systems of the above type have not proved to be particularly useful for relatively fine control, and work continued to develop systems that will operate efficiently at relatively low pressures.

SUMMARY OF THE INVENTION

The invention provides methods for efficiently controlling the pH of a flowing alkaline stream by the injection of liquid $CO_2$ directly into said stream. The pH of the flowing stream is monitored, and when that pH rises above a desired level, for example above pH 8, a signal is generated which is used to control the injection of liquid $CO_2$ into the flowing stream. High pressure $CO_2$ from the usual storage tank is supplied to a proportional control valve which is operated in response to the signal to initially create $CO_2$ of appropriate intermediate pressure from the high pressure $CO_2$ in a manner which significantly reduces its density by creating a significant gaseous fraction. $CO_2$ injection means is employed that is spring-loaded to the closed position and that is set to open at a pressure between about 100 psia and about 150 psia and permit the injection of liquid $CO_2$ into such alkaline stream. Because the proportional control valve operates in a manner so as to significantly reduce the density of the high pressure $CO_2$ (by creating a significant gaseous fraction), pH control over a wider range can be obtained as a result of this change in density. This is consistent with the proportional control valve being constructed so as to open proportionately more widely in response to a stronger signal which is generated as a result of the monitoring step.

BRIEF DESCRIPTION OF THE DRAWINGS

FIG. 3 is an enlarged diagrammatic view of the proportional control valve employed in the system of FIG. 1.

DETAILED DESCRIPTION OF THE PREFERRED EMBODIMENTS

Figure 1:
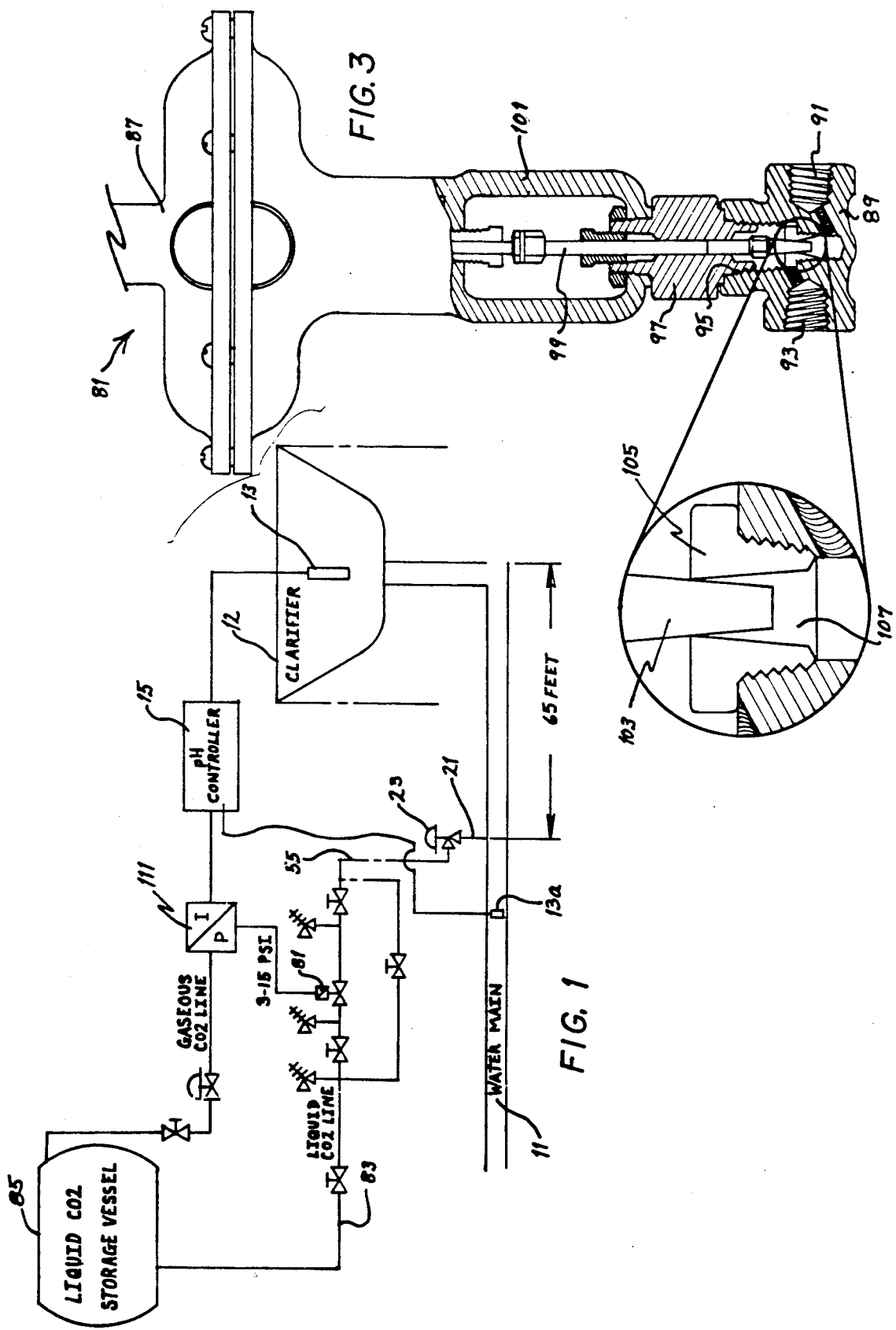
FIG. 1 is an overall schematic view of a system embodying various features of the invention for injecting carbon dioxide into a flowing aqueous alkaline stream.

Depicted in FIG. 1 is a system for wastewater treatment which utilizes carbon dioxide to neutralize a flowing alkaline stream of water. Shown is a pipe or conduit 11 which serves to transport the accumulated wastewater discharges from a large textile or chemical processing plant, for example one for dyeing natural or synthetic fibers or fabrics or the like, as the stream flows to a clarifying basin 12, or the like. The rate of flow of the aqueous stream in the pipe 11 may frequently vary, and the alkalinity of the composite wastewater discharges will also vary, sometimes quite significantly, when discharges from more highly alkaline processing steps become included in the overall composite discharge. The pH of the stream which is indicative of its alkalinity is measured at one or more appropriate location by a pH meter or probe 13. One such pH probe is preferably located downstream of the point of injection an appropriate distance to reflect the change in pH resulting from the injected $CO_2$. Another probe may be located upstream of the point of carbon dioxide injection where it would allow a more immediate response to the detection of a change in pH of the discharge stream to a point above the desired level, which, for example, may be at a pH of about 8 or below. The pH probe 13 puts out a signal that is indicative of the pH being sensed, and this signal may be transmitted to a controller 15 into which the desired pH level has been set. When the controller in turn compares the sensed signal to the setting and determines that the pH has risen above the desired level, it generates a signal that begins the injection of carbon dioxide into the flowing stream. Should the pH continue to remain above the desired level or perhaps even increase, the controller 15 increases the strength of its output signal causing liquid carbon dioxide to be injected into the flowing stream at a greater rate. Regulation in this manner continues until such time as the pH being measured returns to the predetermined maximum desired level or below, at which time injection of carbon dioxide is substantially ended.

In order to efficiently effect control of alkalinity in a flowing stream by injection of $CO_2$ in this general manner, it is important that a system be able to handle both relatively moderate increases in alkalinity as well as to be able to occasionally neutralize very large increases in alkalinity, as it is impossible to predict exactly when there will be discharges of fairly highly alkaline wastewaters into the overall discharge circuit.

Figure 2:
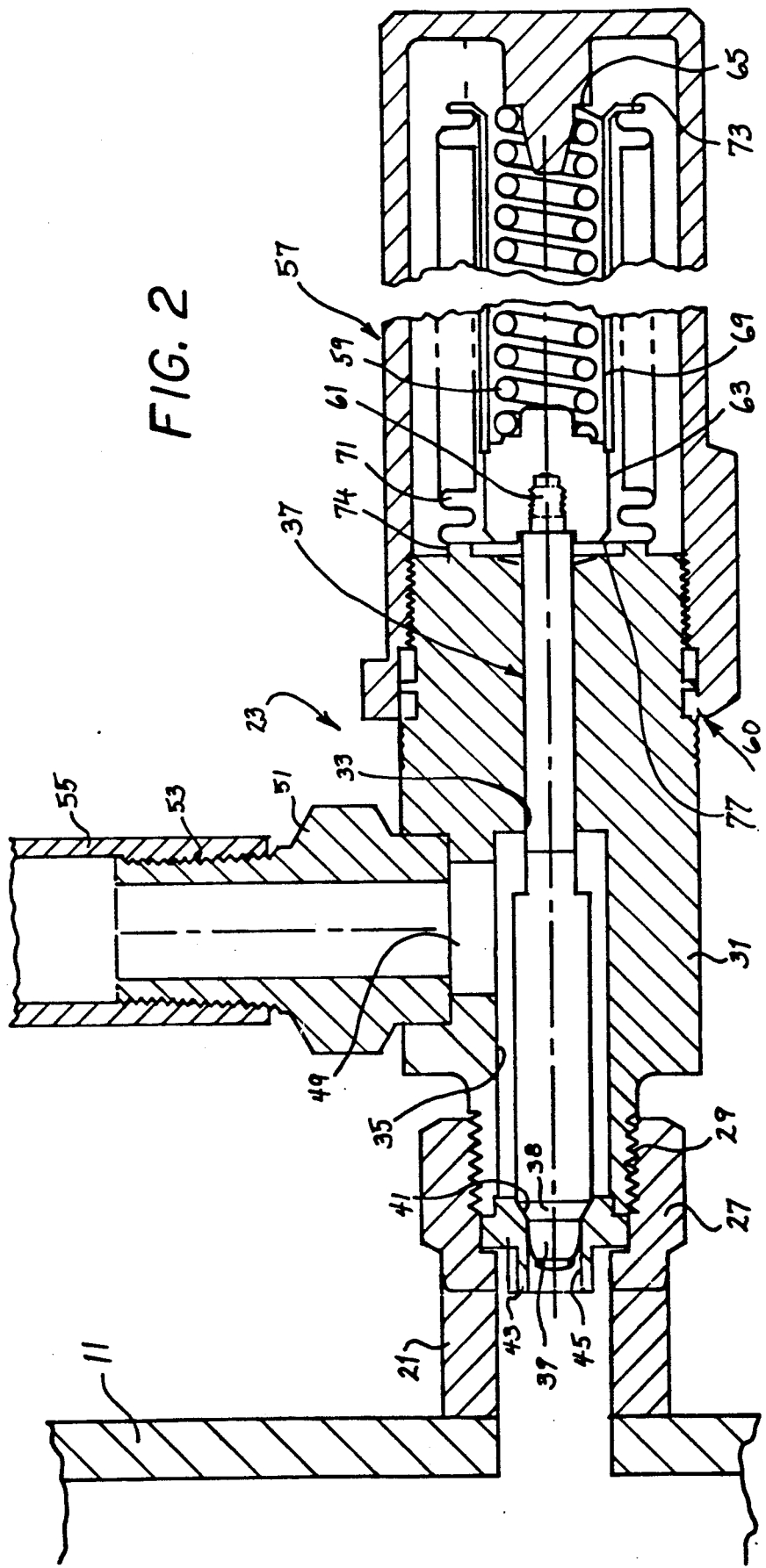
FIG. 2 is an enlarged diagrammatic view of the injection device employed in the system of FIG. 1.

As best seen in FIG. 2, the composite wastewater stream made up of the various discharges may be pumped or otherwise caused to flow through a relatively large diameter pipe or conduit 11, for example a pipe about 30 inches in diameter, and one or more fittings 21 can be mounted in the sidewall of such pipe, which fittings 21 are employed to appropriately mount liquid carbon dioxide injection devices 23. In the preferred embodiment, the fittings 21 are affixed as by welding, brazing or the like, to the metal sidewall of the pipe 11, which fittings are generally tubular in form. An opening 25 is drilled or otherwise formed in the sidewall of the pipe. The free end of the fitting terminates in a collar section 27 that contains an internal thread which accommodates a male threaded region 29 on the discharge end of the carbon dioxide injection device 23.

The injection device 23 includes a main body 31, a portion which has a central bore 33 extending therethrough which widens near its forward end to provide a coaxial cylindrical region 35 which serves as a liquid $CO_2$ passageway. A valve member or spindle 37 reciprocates in the bore 33 of the body portion and has a frustoconical collar surface 38 that leads to a bulbous front tip 39 which has a surface of 3-dimensional convex curvature, which is preferably generally that of a section of an ellipsoid having its longer axis coaxial with the central bore 33. The front collar surface abuts a mating frustoconical seat 41 formed in the rear surface of a plug member 43 that contains a central orifice 45 in the form of a bore of a circular cross section and of a certain minimum cross-sectional area. When the frustoconical collar 38 is seated against the frustoconical seat 41, the orifice is substantially closed. The smooth reciprocating movement of the valve member 37 within the enlarged cylindrical region 35 is assured as a result of the extended bearing surfaces in the region of the narrower diameter portion of the central bore 33. As can be seen, when the valve member 37 is installed within the body 31 of the injection device, an annular flow passageway is provided along the valve member to the orifice which communicates with a side entrance 49. A suitable threaded fitting 51 is installed in the side entrance 49 and provides a free end having a pipe thread 53 to facilitate attachment of the injection device to a line 55 that is a part of the overall piping arrangement.

The rear end of the main body 31 is also threaded and facilitates the attachment thereto of an actuator section 57 which contains a compression spring 59 and the mechanism for causing the valve member 37 to reciprocate in response to pressure applied. An O-ring 60 seals the joint between the actuator section 57 and the main body 31 and prevents the intrusion of moisture. More specifically, the rear end of the valve member 37 carries a threaded element 61 which is received in a tapped hole in an adaptor 63 upon which one end of the compression spring 59 is seated. The other end of the compression spring is received on a boss 65 formed on the interior surface of the actuator housing 67. A sleeve 69 carried by the adaptor 63 extends rearward and surrounds substantially the entire length of the compression spring 59. A bellows 71 is positioned in surrounding relationship to the sleeve 69 with the rear end of the bellows being connected to an annular flange 73 at the rear end of the sleeve; the front end of the bellows is connected to an annular projection 74 formed on the rear surface of the main body 31 of the injector. The bellows 71 thus defines a gas-tight chamber extending from the rear surface of the main body 31, and the pressure within this chamber formed by the bellows 71 changes as the liquid $CO_2$ pressure being supplied to the injector changes, as a result of communication between this chamber and the enlarged region 35 through the narrow annular passageway at the outer surface of the valve member 37 and the narrow region of the bore 33.

The arrangement is such that the pressure on an enlarged flange 77 of the forward end surface of the adaptor 63, which flange is received within annular projection 74 in the closed position, is sufficient, compared to the substantially atmospheric pressure on its rear surface which is outside of the bellows-sleeve chamber, to overcome the pressure of the compression spring 59 and move the valve member 37 rearward, unseating the frustoconical collar and slightly withdrawing the bulbous tip 39 to create an annular passageway between the circular cross section orifice 45 and the ellipsoidal tip of the valve element. The components are preferably designed and chosen so that the valve member 37 will begin to unseat at a pressure of about 90 to 110 psig. There is some adjustability designed into the injector; by rotating the threaded actuator section 57 relative to the main body, the amount of compression exerted by the spring 59 on the valve member 37 is changed and thus allows fine-tuning of the pressure at which the orifice will open. Moreover, the relationship between the cylindrical sidewall of the orifice 45 and the curved surface of the bulbous tip is such that the rate of increase in effective orifice size is nonlinear relative to the axial movement of the valve member 37. This provides for a relatively small annular orifice initially which contributes to achieving precise control at low pressures upon opening of the injector 23. To assure that adequate high pressure flow can be achieved through the same orifice, it is believed the orifice should have a cross-sectional area of at least about 0.15 sq. inch for an injector operating in the range of about 100 to about 300 psig. The higher the pressure rises within the bellows, the further the valve member 37 will be displaced rearward and the larger will be the opening at the rear end of the orifice until the tip 39 is withdrawn beyond the plane of the seat 41.

A proportional control valve 81 is located in a line 83 which carries liquid $CO_2$ from the standard high pressure $CO_2$ storage tank 85 which is usually maintained at about 300 psig and 0° F. The control valve 81 is spring-biased to a closed position and opens in response to the application of gas pressure to an actuator portion 87 that is sometimes referred to as the topworks. More specifically, as best seen in FIG. 3, the valve is preferably of the globe type and has a lower valve body 89 that includes entrance and exit openings 91, 93 in line with each other in the generally T-shaped body and an upper central threaded opening 95 into which the mating end of a bonnet 97 is received within which a valve stem 99 reciprocates. The topworks 87 and the bonnet 97 are interconnected by a yoke 101.

The lower end of the valve stem 99 terminates in a generally conical tip 103 which is received in an opening of suitable size is a threaded plug 105 which is received in the threaded wall section of a central bore 107 that interconnects the openings 91, 93, the plug serving as the seat for the valve with the inlet opening 91 communicating with the central bore 107 at a location below the seat. The further the valve stem 99 is withdrawn upward in FIG. 3, the larger will be the opening between the conical tip surface 103 and the circular seat. When the valve is only slightly open and high pressure liquid $CO_2$ is allowed to slowly flow through this opening, a substantial drop in pressure occurs and a change in the quality of the fluid also occurs. A fraction of the liquid $CO_2$ changes to $CO_2$ vapor as a result of the construction of the valve through which this expansion takes place and the change in pressure. If for example the pressure is dropped from 300 psi to about 150 psi, the quality of the resultant fluid is such that it contains about 14 weight percent $CO_2$ vapor; on the other hand, if the pressure were dropped from 300 psi to about 110 psi, the resultant fluid would contain about 18 weight percent $CO_2$ vapor. As a result of this change, there is a consequent change in the density of the fluid $CO_2$, with the density becoming lower depending upon the amount of the vapor fraction which is created. It has been found that the creation of lower density fluid $CO_2$ at high pressure drops allows closer control of the amount of $CO_2$ being injected into the flowing alkaline stream and more efficient overall neutralization of a stream of varying alkalinity.

In order to effectively operate in the desired manner at both low flow and high flow of liquid, the globe control valve 81 should have a valve flow coefficient ($C_v$) between about 2 and about 6 and preferably between 2.5 and 5 when measured at full open condition. $C_v$ is a dimensionless number that is equal to the product of the rate of flow of liquid (in gallons per minute) times the square root of the quotient of the specific gravity of the liquid divided by the pressure drop (in pounds per square inch). In a preferred control valve, the pressure drop in full open condition is only about 5 psi.

As previously indicated, the pH probe 13 is preferably located somewhere downstream from the point of injection so that the effect of the injection of $CO_2$ into the flowing stream will be seen in the pH being sensed by the probe. In other words, if the amount of $CO_2$ being injected is sufficient to neutralize the alkalinity of the stream and return it to or toward the desired predetermined pH level, e.g. pH 8.0, the probe 13 will begin to fairly quickly sense decreasing pH levels. In the embodiment depicted in FIG. 1, the signal from the pH probe 13 is received by the controller 15 into which the desired pH level can be set. So long as the pH of the flowing stream being monitored is at or below this set level, the proportional control valve 81 is allowed to remain closed and there is substantially no injection of $CO_2$ into the alkaline flowing stream. However, as soon as a rise in pH above the desired level is detected, the controller 15 immediately sends a signal, for example, a 4 to 20 milliamp electrical signal, to the proportional control valve 81. Any suitable type of control system can be employed, e.g., electrical or pneumatic. Inasmuch as there is a ready source of high pressure vapor available from the vapor section of the standard liquid $CO_2$ storage vessel, i.e., vapor at about 300 psig, it is convenient to use $CO_2$ vapor for transmitting signals to control the proportional control valve. The higher the pressure of the vapor that is applied to the topworks 87 of the proportional control value, the wider the valve orifice will open and the less will be the pressure drop across the orifice, resulting in a higher intermediate $CO_2$ pressure downstream of the valve. The magnitude of the signal generated by the controller 15 of course determines the amount of pressure applied to the topworks, and the magnitude of the signal put out by the controller 15 varies with the pH being sensed by the probe so that, when a higher pH is being sensed, a signal of greater magnitude will be generated by the controller. If a pressure supply from the $CO_2$ storage tank is used to control the opening of the proportional control valve, a suitable transducer 111, such as one sold as Fairchild Model T-5200, may be used to translate the electrical signal provided by the controller 15 into an appropriate pneumatic signal for the proportional control valve 81.

When the overall system is in place and operating, one or more injection devices 23 are appropriately mounted on a length of pipe 11 for carrying the alkaline wastewater stream to a clarifier 12 at a location, for example, about 65 feet in length from the exit to the clarifier. A pH probe 13 is provided in the clarifier 12 and if desired, a second pH probe 13a could be provided upstream of the point of injection. Because the wastewater being pumped through the pipe may carry fine particulates that will be removed in the clarifier, the mounting of the injection devices 23 via fittings 21 welded to the sidewall of the pipe creates a positive deterrent to erosion problems that could well arise if they were mounted directly in the flowing stream; moreover, injecting the liquid $CO_2$ through injectors positioned in this fashion outside the sidewall of the pipe has a further advantage. It has been found that the injection of substantially liquid $CO_2$ transversely into the flowing stream causes a shearing action to occur which, together with the refrigeration effect of the expanding liquid $CO_2$, results in prompt dissolution of the $CO_2$ in the stream. It is found that in about 20 seconds following injection, the average time it takes the stream to travel the 65 feet distance, substantially all (more than about 95% by weight) of the injected $CO_2$ has been absorbed into the flowing stream.

The use of two such probes can be advantageous for the probe which is upstream of the point of injection will give advance warning of rise in alkalinity of the wastewater stream being delivered to the clarifier and will initiate appropriate response by beginning injection of liquid $CO_2$. In addition, the inclusion of the two probes allows the signals being generated by each probe to be compared, and depending on the comparison, it is possible to appropriately increase or decrease the rate at which $CO_2$ is being injected into the flowing stream, which may be helpful in making the overall process still more efficient by preventing over-shooting of the desired end point. However, one of the more important advantages of the illustrated system is believed to lie in the close control of $CO_2$ injection at relatively low range intermediate pressures, i.e. about 150 psig and below, occurring when relatively low levels of alkalinity are being detected, which advantage results from the ability to generate a low density $CO_2$ fluid that is supplied to the spring-loaded injectors and injected into the stream. This results in close control and thus efficient utilization of $CO_2$ as needed to neutralize the stream at such relatively low levels.

Although the invention has been described with regard to certain preferred embodiments which constitute the best mode presently known to the inventor for carrying out the invention, it should be understood that various modifications and changes as would be obvious to one skilled in this art may be made without departing from the invention, the scope of which is defined by the claims which are appended hereto. For example, other ways of measuring the pH could be employed, and different ways of controlling the operation of the proportional control valve can be used other than reliance upon the $CO_2$ vapor pressure for this function.

Particular features of the invention are set forth in the claims which follow.

What is claimed is:

1. A method of efficiently controlling the pH of a flowing alkaline wastewater stream, which method comprises monitoring the pH of said flowing stream, generating a signal in response to said pH monitored, supplying high pressure liquid $CO_2$ to a proportional control valve, operating said control valve in response to said signal to lower the pressure of said high pressure liquid $CO_2$ to an intermediate pressure in a manner so as to significantly reduce the density of said liquid $CO_2$ by creating a significant gaseous $CO_2$ fraction, and supplying said mixture of liquid $CO_2$ and gaseous $CO_2$ of lower density to spring-loaded injection means having orifice means in communication with said flowing stream, said intermediate pressure being above the pressure at which said injection means will open whereby said lower density mixture of liquid $CO_2$ and gaseous $CO_2$ flows through said orifice means and is injected into said flowing stream.

2. A method according to claim 1 wherein said control valve is operated to lower the density of said liquid $CO_2$ by creating at least about 10 weight percent $CO_2$ vapor in reducing said liquid $CO_2$ to said intermediate pressure.

3. A method according to claim 2 wherein said intermediate $CO_2$ at a pressure of about 100 psia causes said injection means to open.

4. A method according to claim 3 wherein said injection means opens in a nonlinear relationship with respect to increases in pressure, opening relatively narrowly at the lower range of opening pressures.

5. A method according to claim 1 wherein said $CO_2$ mixture is injected into said flowing stream in a transverse direction to create a shearing force thereupon.

6. A system for efficiently controlling the pH of a flowing stream of varying alkalinity, which system comprises spring-loaded injection means having an orifice in communication with conduit means wherien the stream flows and being set to open at a predetermined pressure, a piping arrangement constructed so as to supply liquid $CO_2$ to said injection means said arrangement further including a proportional control valve, a source of high pressure liquid $CO_2$ connected to said piping arrangement upstream of said control valve, and means for monitoring the pH of the stream flowing in said conduit means and generating asignal when the pH of the stream being monitored exceeds a predetermine level, said control valve being operable in response to the strength of said signal to open proportionately more widely and thereby vary the $CO_2$ pressure downstream thereof, and said valve being constructed so as to significantly lower the density of liquid $CO_2$ when reducing the $CO_2$ pressure to an intermediate pressure above said predetermined pressure at which said spring-loaded injection means opens, by creating a significant gaseous $CO_2$ fraction, whereby said lower density mixture of liquid $CO_2$ and gaseous $CO_2$ is supplied to said injection means, and is injected through said orifice in to the flowing stream.

7. A system according to claim 6 wherein said proportional control valve is a globe valve which has a valve opening of circular cross section and a spring-loaded stem member having a conical tip portion, said stem member being supported for axial movement of said tip portion into and out of said valve opening so as to control flow of $CO_2$ therethrough.

8. A system according to claim 7 wherein said stem member is spring-loaded to a closed position.

9. A system according to claim 6 wherein said injection means orifice is variable in effective cross-sectional area as a result of its interaction with a spring-loaded valve element which is set to begin to open said orifice when the intermediate pressure reaches a value between about 90 psia and about 110 psia.

10. A system according to claim 9 wherein said orifice is of circular cross section and said valve element has a tip of convex curvature that fits within said orifice and creates an annular flow passageway therebetween.

11. A system according to claim 10 wherein said tip is generally that of a section of an ellipsoid and said orifice is defined by a right circular cylindrical passageway.

* * * * *